Patented Mar. 6, 1951

2,543,805

UNITED STATES PATENT OFFICE 2,543,805

METHOD OF PRODUCT CONTROL IN SUSPENSION POLYMERIZATIONS

Robert C. Reinhardt, Midland, Mich., assignor to The Dow Chemical Company, Midland, Mich., a corporation of Delaware No Drawing. Application July 18, 1945, Serial No. 605,825

1 Claim. (Cl. 260—87.7)

This invention relates to a method for the polymerization of suspensions of monomeric substances in liquids which are non-solvents both for the monomeric substance and for the polymer products. It relates in particular to an improvement in the suspension polymerization of monomers which normally pass from a liquid to a sticky semi-liquid agglomerative state and from thence to a non-sticky granular condition in the process of their polymerization in a non-solvent liquid.

It is to be understood that the term "suspension" is used herein to designate dispersions of macroparticles which are maintained in a suspended condition in a non-solvent medium either by agitation alone or by a combination of agitation and a protective colloid, such as a gum or a cellulose ether which is soluble in the suspension medium. The commonest suspension medium is water. Others, such as the glycols, may also be used. The use of emulsifiers or surface active agents is not contemplated in the process of the present invention.

It has been recognized in my prior application, Serial No. 546,051, filed July 21, 1944, now Patent No. 2,445,970, that there are many polymerizable liquids which may advantageously be polymerized in a suspension in a liquid non-solvent for both the monomer and the polymer and that such polymerization is often characterized by a transition of the dispersed macroparticles from a liquid to a sticky semi-liquid agglomerative state and from thence to a non-sticky granular condition. Among the monomeric materials which characteristically pass through the three physical states listed above, in the course of their polymerization in a non-solvent liquid, are vinylidene chloride, vinyl chloride, vinyl acetate, vinyl butyrate, styrene, acrylonitrile, esters of acrylic or methacrylic acids, and mixtures thereof with one another.

In the preparation of most polymeric substances, it is a primary object to provide a product which is suitable for use in such typical plastics working operations as extrusion, injection molding, compression molding and the like. For such uses, it is highly desirable that the plastic being supplied to the molding or extrusion apparatus be not only uniform in composition but also substantially uniform as to particle size. It is often desirable that the feed be granular in character rather than powdery. In the typical emulsion polymerization of most monomeric substances the polymer obtained is a fine powder which must often be reworked, in order to provide a granular feed for extrusion or molding operations. In the typical suspension polymerization heretofore known, wherein the material passes through the three successive stages outlined above, it has often occurred that the polymer product varied in particle size from very fine powder to coarse granules or pellets and the instance has been known in which particles the size of eggs or larger have been found among those of smaller size in the product. It is believed that such non-uniformity of the particle size in suspension polymerizations is due to the necessity of passing through the sticky agglomerative state during the process. If at this stage of the operation sufficient agitation is provided to break up the individual particles, a grinding action occurs and an excessive amount of powder, together with some larger pellets, is obtained as an end product. If the amount of agitation is reduced to avoid excessive powder formation the size of the pellets or granules may increase almost without limit. One means of solving this problem is set forth in my aforesaid copending application.

In spite of the above-mentioned disadvantages which have attached to the use of the suspension method of polymerization certain advantages also attach to this method of operation. Chief among these is the fact that the product obtained does not contain internally bound or surface-borne emulsifying agent. Most emulsifying agents, not being thermoplastic in character, and having little, if any, softening or plasticizing action on organic thermoplastics, perform no useful function in and often interfere with such heat forming operations as extrusion or injection molding. During emulsion polymerization reactions the surface active agents employed often become bound in the fine particles and their removal from the polymer becomes practically impossible.

It is accordingly an object of the present invention to provide a method for the suspension polymerization of liquid monomeric substances which normally pass from a liquid to a sticky semi-liquid agglomerative state and from thence to a non-sticky granular condition during such a polymerization, without the necessity for passing through the said agglomerative state. A related object is the provision of a method for the suspension polymerization of monomers of the type above-identified whereby there may be produced polymer particles of substantially uniform composition and particle size. A particular object is to provide a method as aforesaid whereby there is produced a polymer, the uniform particles of which are adapted to direct application to extrusion or plastics molding operations. It is a specific object of the invention to provide such a method for the suspension polymerization of vinylidene chloride and of polymerizable mixtures containing the same.

The invention will be illustrated with particular reference to the polymerization in aqueous suspension of vinylidene chloride monomer. When this monomer is suspended in water, suitably in the presence of a small amount of benzoylperoxide, and is agitated at a polymerization temperature usually in the range of from about 25° to about 60° C., it passes successively through the three physical states discussed above. It has been found that the suspended insoluble droplets of vinylidene chloride remain essentially liquid while the polymerization progresses from 0 to about 5 per cent. Thereafter the suspended particles are semi-liquid and sticky and tend to agglomerate into larger particles while the polymerization progresses from about 5 to about 15 per cent. The particles then harden to a non-sticky granular condition which continues through the balance of the polymerization process.

It has now been found that the foregoing and related objects may be attained by a method which comprises providing a suspension in a non-solvent liquid of a polymerizable substance in the non-sticky granular state and adding thereto a suspension of the corresponding monomer at a temperature known to induce polymerization and at such a rate that the suspension remains in the non-sticky granular condition. In the case of vinylidene chloride polymers the present process requires the provision of an aqueous or similar non-solvent suspension of non-sticky granular particles which have been polymerized at least 15 to 20 per cent and adding thereto a suspension comprising vinylidene chloride monomer at a rate such that the degree of polymerization in the suspension remains above 15 per cent. If desired the process may be made continuous by withdrawing a portion of the suspended polymer in amount corresponding to the introduced suspension of monomer. While this may be accomplished in any of numerous known types of polymerization equipment, it is preferred to carry out the reaction in a closed cyclic system in which the suspension may be circulating at a constant rate while there is being introduced continuously a small amount of monomer, together with water or similar liquid to suspend the monomer, and at the same time there is being withdrawn from a point distant in the direction of flow from the point of introduction a corresponding amount of suspended polymer. In such a system, uniform particle size is assured by the constant rate of circulation and by the continuous balance between feed, withdrawal and polymerization rate, i. e. the continuous avoidance therein of conditions which might permit the formation of sticky and agglomerative particles. The initial charge, if desired, may be polymerized in that system or it may be prepared by the simple suspension in water of an appropriate amount of previously formed polymer of the desired composition and particle size. The ratio of suspended particles to suspension medium may vary considerably, but generally lies between 1 and 0.2 for practical operation.

The success of the new method is dependent upon or arises from the fact that the freshly introduced monomer is absorbed in large part by the particles of solid polymer already in the system about as fast as the monomer is introduced and there is thus no time at which sticky or agglomerative masses are present in the mixture. Since the suspended particles are solid at all time and show no tendency to adhere or stick together, the agitation may be adjusted to provide the amount of grinding action on the particles which will at the same time avoid the formation of particles which are too large and those which are too fine. It is thus possible to obtain, by filtration and drying of the withdrawn reaction product, a polymer which may be used directly as feed material for plastics working machines.

In a specific example, a suspension of 54 pounds of vinylidene chloride monomer, 6 pounds of vinyl acetate monomer and 0.06 pound of benzoyl peroxide in 200 pounds of water was heated with agitation in a glass lined kettle at 50° C. for 16 hours. At the end of this time the estimated conversion of monomer to polymer was about 25 per cent and the mixture consisted of a suspension of hard granules. The suspension was then cooled, removed from the kettle, and loaded into a closed coil of glass pipe 4 inches in diameter and 44 feet in total length. The suspension of partially polymerized material was circulated through the glass coil at the rate of 4 to 5 lineal feet per second, which was sufficient to maintain the dispersion, and the temperature was maintained at about 30° C. by means of a water jacket around the glass pipe. After circulation of the charge had been established there was continuously introduced into the system an aqueous suspension consisting of about 92 per cent by weight of water and 8 per cent by weight of a mixture of the monomers of vinylidene chloride and vinyl acetate in the proportions previously employed. The introduced aqueous suspension contained 1 per cent of benzoyl peroxide, based on the weight of suspended monomer. The rate of introduction of this suspension was about 500 grams of water and 44 grams of monomer per hour. A similar amount of suspended granular polymer in its accompanying aqueous medium was withdrawn continuously from a point in the coil 22 feet removed from the point of feed. From the known dimensions of the apparatus, it is estimated that only 0.5 per cent of the suspended product was being withdrawn each hour, and correspondingly only 0.5 per cent of the suspension was newly introduced within the hour. After operating for 50 hours, circulation was stopped and the coil was emptied. The total yield of polymer, all of which was a uniform granular, non-sticky product, was 34.4 pounds, including that collected during operation of the coil polymerizer. After allowing for the polymer originally produced in the kettle, the polymerization rate in the coil was found to be 0.6 per cent per hour. The dried polymer was found to be satisfactory for use as feed material, without purification, in a standard extrusion machine. The average extent of polymerization had increased in the coil from an initial 25 per cent value to a final value near 70 per cent. This means that both feed and withdrawal could be at a somewhat greater rate than that employed (up to 5 times as great), other factors remaining constant, without running into any danger of agglomeration, since the sticky state would not be encountered.

In commercial operation, the process would normally be continued indefinitely, and two or more similar coils might be operated in series, a small portion of partial polymer being continuously withdrawn from the first and used as feed for the second coil, wherein polymerization would continue more nearly toward completion. The use of such a multiple coil polymerization system is described and claimed by R. H. Boundy in application Serial No. 545,988, filed July 21, 1944 (now abandoned) and in a continuation-in-part thereof, Serial No. 710,469, filed November 18, 1946, now abandoned.

The invention has been illustrated with reference to continuous operation in a coil or series of coils, but is by no means limited to such type of operation. Thus, in a batch type of procedure, a suspension of non-sticky partially or fully polymerized particles may be prepared in a non-solvent liquid, suitably in a kettle fitted with a stirrer, and there may be added thereto an amount of monomer such that the average degree of polymerization in the kettle always exceeds the maximum amount from which sticky, agglomerative particles are obtained. The monomer may be introduced continuously or in small batches, relative to the inventory of polymer in the kettle, and may be introduced alone or mixed with the non-solvent suspension medium, and should contain catalytic quantities of benzoyl peroxide or other suitable accelerator. The suspension of polymer may likewise be allowed to accumulate in the kettle, or it may be removed continuously or in small batches. It is often desirable, in batch operation, to build up gradually an inventory about equal to the working capacity of the reactor, and then to discontinue monomer addition and to continue agitation at a polymerization temperature until substantial completion of the reaction. A uniformly effective degree of agitation must be maintained throughout the polymerization, to provide a product of uniform particle size.

If desired, there may be added to the suspension, during polymerization, a plasticizer for the polymer in amount to provide the desired final plasticized composition. The usual plasticizers are insoluble in the aqueous or other non-solvent media used in suspension polymerizations, and suspended droplets of the plasticizer become absorbed by or adsorbed on the suspended polymer particles. In like manner, if desired, there may be added suspensions of other such modifying agents as heat and light stabilizers, oil-soluble dyes, and the like.

When operating in accordance with the present invention, the usual conditions of temperature, and the customary catalysts are employed for the particular monomer or mixture of monomers being subjected to polymerization. The invention does not reside in the selection of these conditions, but rather in the controlled addition of monomer to the suspension at such a rate as to avoid the sticky, agglomerative condition in the suspended particles, i. e. at such a rate as to maintain in the suspension an average condition typical of the third stage in such polymerizations, wherein the suspended particles are non-sticky granules. The actual ratio of monomer to polymer at which this transition from sticky to "dry" particles occurs is different for each monomeric material, but in the case of vinylidene chloride and its copolymers this ratio does not exceed 4, i. e. there should be not more than 4 parts of monomer for each part of polymer, to avoid the sticky state.

I claim:

In the suspension polymerization of vinylidene chloride and mixtures thereof with a monomer selected from the group consisting of vinyl chloride, vinyl acetate, vinyl butyrate, styrene, acrylonitrile, esters of acrylic acid and esters of methacrylic acid, wherein vinylidene chloride predominates, and which normally pass during polymerization from a liquid to a sticky agglomerative state and thence to a non-sticky granular condition, the steps which include: maintaining a polymerization temperature in a constantly agitated aqueous suspension of from 0.2 to 1 part by weight of non-sticky granular particles consisting of at least 20 per cent of the desired polymer, any balance being essentially the corresponding monomer, for each part by weight of water, and in the absence of an emulsifying agent; adding thereto a suspension of the corresponding monomeric material and a polymerization catalyst, in water, in a ratio and at a rate to maintain in the system not over 4 parts of monomer for each part by weight of polymer, while withdrawing therefrom suspended polymer at a rate equivalent to the rate of monomer feed, thereby maintaining a steady state in the system and a non-sticky granular condition in the disperse particles throughout their residence in the polymerization zone; and recovering the non-sticky polymer particles from the withdrawn portion of the reaction mixture.

ROBERT C. REINHARDT.

REFERENCES CITED

The following references are of record in the file of this patent:

UNITED STATES PATENTS

| Number | Name | Date |
|---|---|---|
| 2,171,765 | Röhm et al. | Sept. 5, 1939 |
| 2,380,009 | Arnold et al. | July 10, 1945 |
| 2,445,970 | Reinhardt | July 27, 1948 |